N. PIQUETTE.
SWEEP FOR HAY PRESSES.
APPLICATION FILED MAR. 24, 1909.
938,700.
Patented Nov. 2, 1909.
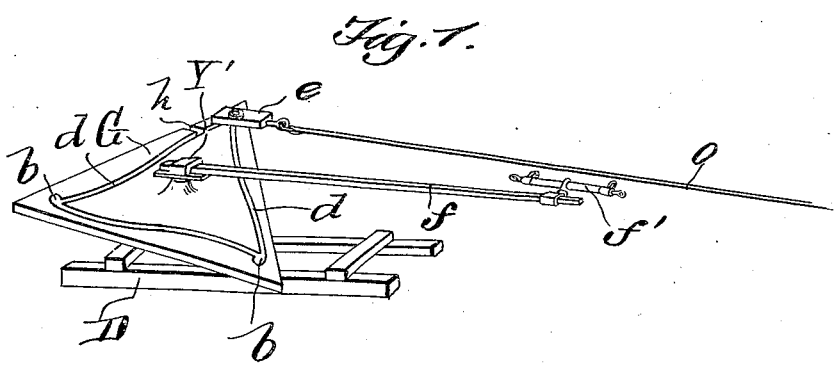
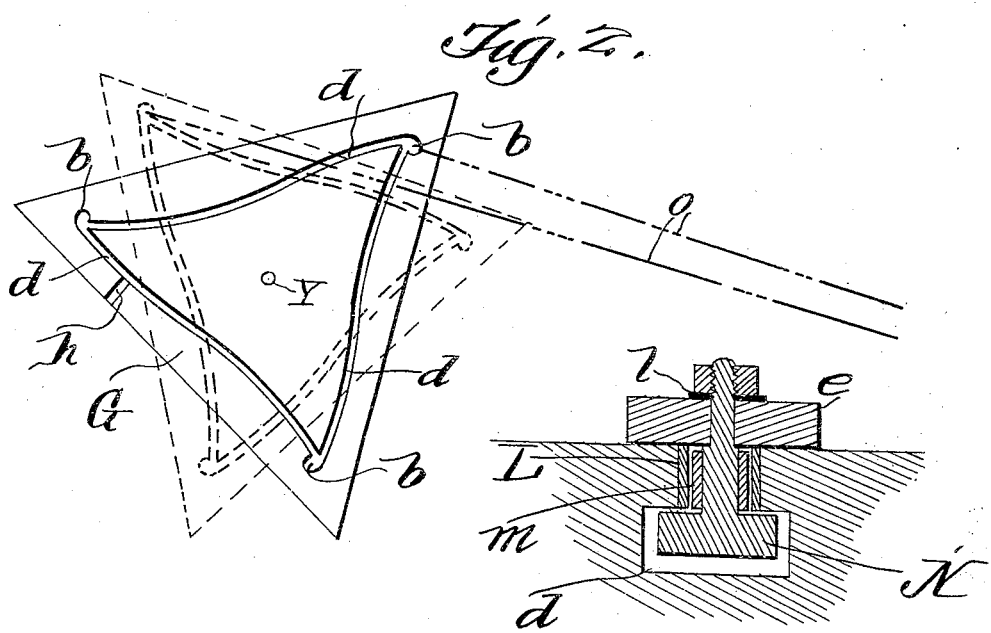
WITNESSES:
INVENTOR.
Napoleon Piquette
BY
Franklin H. Hough
ATTORNEY.

UNITED STATES PATENT OFFICE.

NAPOLEON PIQUETTE, OF CHASSELL, MICHIGAN.

SWEEP FOR HAY-PRESSES.

938,700.

Specification of Letters Patent.

Patented Nov. 2, 1909.

Application filed March 24, 1909. Serial No. 485,434.

*To all whom it may concern:*

Be it known that I, NAPOLEON PIQUETTE, a citizen of the United States, residing at Chassell, in the county of Houghton and State of Michigan, have invented certain new and useful Improvements in Sweeps for Hay-Presses; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in sweeps for hay and other presses and comprises various details of construction, combinations and arrangements of parts which will be hereinafter fully described and then specifically defined in the appended claim.

I illustrate my invention in the accompanying drawings, in which:—

Figure 1 is a perspective view of the sweep. Fig. 2 is an enlarged top plan view of a portion of the apparatus, and Fig. 3 is a sectional view through the shoe, bolt and grooved platform.

Reference now being had to the details of the drawings by letter, G designates a triangular outlined platform having a cam groove $d$ formed therein, said groove being substantially triangular in shape with three curved legs each terminating in a shouldered portion $b$, the latter being rounded. A base, designated by letter D, has a pivotal post Y projecting therefrom upon which said platform is mounted and a socket member Y' upon said pivoted post is adapted to receive the sweep pole $f$ to which a whiffle tree $f'$ is attached. Mounted to travel in said groove is a headed bolt N, the head of which is engaged within an enlarged portion of the groove $d$, as shown in Fig. 3 of the drawings, while the shank portion of the bolt projects through the slot and has a shoe $e$ fastened thereto by means of a nut $l$.

Mounted upon the shank portion of the bolt is an anti-friction roller $m$, and L designates a lining to the marginal edges of the contracted portion of the groove and against which said anti-friction roller is adapted to travel. Fixed to one end of the shoe is a cable O designed to be attached to the press, and $h$ designates a groove leading into the groove $d$, thus affording means whereby the bolt may be inserted within the groove $d$.

In operation, a horse or team being connected to the whiffle tree is adapted to cause the sweep to turn with the platform and, as the platform turns, the shoe riding in the triangular groove, will be drawn taut three times during a revolution of the platform, the drawing of the cable taut being caused by the bolt engaging the shouldered portions at the ends of the angles of the groove. When the cable comes in alinement with one of the legs of the groove, the cable will be slackened, this occurring three times in the revolution of the platform, thus allowing the necessary slack for supplying additional hay or other matter being pressed. The anti-friction cylinder upon the shank portion of the projection of the shoe will be drawn into the adjacent leg of the groove and, as the latter is cam shaped, the sudden releasing of the pull upon the cable will be moderated as the anti-friction cylinder is drawn through the leg of the groove to the next shoulder at the end of the groove. By the provision of an apparatus of this nature, the stopping of a horse or team each time it is desired to supply additional material to be pressed is avoided, thus saving considerable time in the pressing operation.

What I claim to be new is:—

A sweep for operating presses, etc., comprising a triangular outlined rotatable platform, a central post rising therefrom, a sweep fixed to said post, said platform having a substantially triangular outlined undercut groove, the legs of the groove each being shaped in a compound curve, an end of each leg of the groove formed into a pocket extending laterally at the end of an adjacent leg of the groove, a bolt having a head mounted in the undercut portion of said groove and held in place by the overhanging walls of the groove, an anti-friction roller mounted upon the shank of said bolt, a shoe upon the outer end of said bolt and resting upon the upper face of the platform, as shown and described.

In testimony whereof I hereunto affix my signature in the presence of two witnesses.

NAPOLEON PIQUETTE.

Witnesses:
FRANK ST. GOMANS,
JOHN D. FISH.